United States Patent [19]

Sommerville

[11] 4,041,643
[45] Aug. 16, 1977

[54] PLANTER BOX

[76] Inventor: Robert E. Sommerville, 541 Harriet, Aptos, Calif. 95063

[21] Appl. No.: 686,180

[22] Filed: May 13, 1976

[51] Int. Cl.² .......................................... A01G 9/02
[52] U.S. Cl. ............................................ 47/66; 217/5
[58] Field of Search ............... 217/12 R, 5; 403/381; 144/309 L; 43/34; 47/35, 39, 36, 40

[56] References Cited

U.S. PATENT DOCUMENTS

| | | | |
|---|---|---|---|
| 255,458 | 3/1882 | Rockwell | 217/12 R |
| 687,894 | 12/1901 | Mayers | 144/309 L |
| 1,067,910 | 7/1913 | Florey | 403/381 |
| 1,643,508 | 9/1927 | Miller | 217/5 |
| 2,072,395 | 3/1937 | Dodson | 47/34 |
| 3,955,320 | 5/1976 | Serovy | 47/34 |

Primary Examiner—Robert E. Bagwill
Attorney, Agent, or Firm—Robert G. Slick

[57] ABSTRACT

A planter box is provided wherein the front and back members have deep dados cut therein with the side members fitting loosely within the dados. A bottom member is provided which is substantially smaller than the enclosed area of the planter box. Expansion of any of the wooden members does not destroy the integrity of the box.

2 Claims, 3 Drawing Figures

PLANTER BOX

SUMMARY OF THE INVENTION

The present invention relates to a planter box of sturdy construction and which is attractive in appearance.

In the past it was always thought necessary to construct such planter boxes of resistant woods such as cedar or redwood, but the novel construction of the present planter box allows that it be constructed of soft woods which are relatively inexpensive, such as pine. According to the present invention, front and back members of the planter box have deep dados cut therein into which the side members fit loosely. The bottom member is substantially smaller in area than the enclosed area of the front, back and side members so that any of the members can expand or contract without destroying the integrity of the box.

Since the members are set into deep dados, the box is of very sturdy construction and can even be constructed of relatively soft woods which are ordinarily thought unsuitable for use in such structures.

DESCRIPTION OF THE PREFERRED EMBODIMENTS

In the drawings forming part of this patent application

DESCRIPTION OF THE PREFERRED EMBODIMENTS

Figure 1:
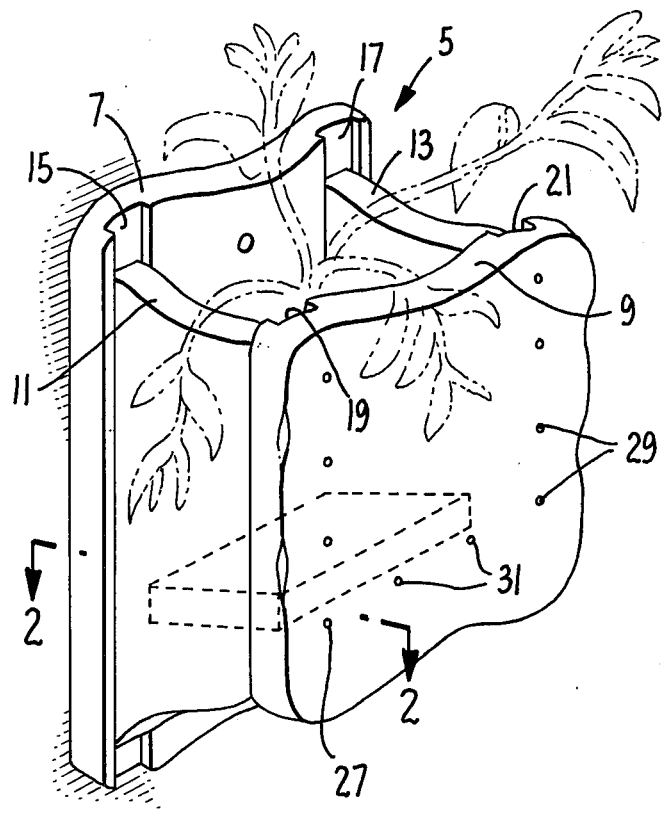
FIG. 1 is a perspective view of a planter box embodying the present invention.
Figure 2:
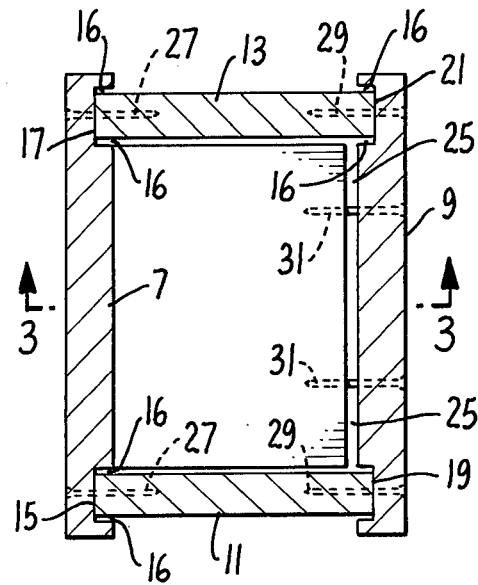
FIG. 2 is a section on the line 2—2 of FIG. 1
Figure 3:
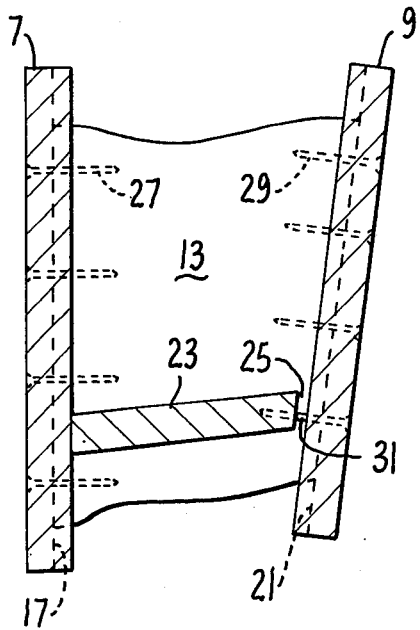
FIG. 3 is a section on the line 3—3 of FIG. 2.

Referring now to the drawings by reference characters, the planter box of the present invention is generally designated 5 and consists of a back member 7, a front member 9, a side member 11, and a second side member 13. The front and back members 7 and 9 are provided with deep, wide dados, namely 15 and 17, on the back member and 19 and 21 on the front member. These dados are substantially wider than the side members as is shown at 16. In a practical embodiment, the box was constructed of ½-inch lumber and the dados had a clearance of about 1/16-inch at each side. The side members 11 and 13 fit into these dados as is shown and are held in the center of the dados by nails 27 and 29. The sides of the dados are thus not in contact with the sides 11 and 13 when the structure is dry. When the box becomes moist, the wood expands, filling the dados. If the clearance is greater than about 1/16 inch, the dados would not be effective.

A bottom member 23 is provided which is substantially smaller than the area enclosed by the front, back and side members so that the gap 25 is left at one edge thereof. The structure is held together by means of nails 27 and 29 which connect the front and back members with the side members, as previously described. The bottom is held by nails 31 which pass through the space 25 and to the bottom 23.

By constructing the planter box in this manner, expansion is taken care of in every direction. This is particularly true of the bottom member since if it gets moist and expands, it merely slides over the nails 31 so that the integrity of the planter box is not destroyed. Similarly the sides are supported only at their centers so that swelling of the sides does not destroy the box.

Although a specific embodiment of the invention is shown, it will be obvious to those skilled in the art that many variations can be made in the exact structure shown without departing from the spirit of this invention.

I claim

1. A planter box having front and back members, said front and back members having deep dados therein and having side members fitting loosely into said dados to form a generally rectangular box-like member and nails passing from said front and back members at the centers of said dados into said side members, said nails holding said side members substantially in the center of said dados and a bottom for said planter box, said bottom having an area substantially less than that encompassed by the front, back and side members, said bottom being located to leave gaps between the bottom and the two sides and the front, and being held in place solely with nails extending from the front, bridging the gap between the bottom and the front and into the bottom whereby said bottom member can expand and slide over said nails without destroying the integrity of the planter box.

2. The structure of claim 1 wherein the sides of each of the dados has a clearance of about 1/16 inch with the side members.

* * * * *